(No Model.)

J. A. LAWRENCE.
CHURN POWER.

No. 306,022. Patented Sept. 30, 1884.

Witnesses:
Thos. W. Randolph.
Fred Widman.

Inventor.
Joseph A. Lawrence.
Per Z. P. Dederick.
Attorney.

United States Patent Office.

JOSEPH A. LAWRENCE, OF SHERMAN, TEXAS.

CHURN-POWER.

SPECIFICATION forming part of Letters Patent No. 306,022, dated September 30, 1884.

Application filed May 23, 1884. (No model.)

*To all whom it may concern:*

Be it known that I, JOSEPH A. LAWRENCE, a citizen of the United States, residing at Sherman, in the county of Grayson and State of Texas, have invented a new and useful Churn-Power, of which the following is a specification.

My invention relates to improvements in churn-powers in which suitable gearing and frame-work operate in conjunction with a vertically-reciprocating dasher, and the objects of my improvements are, first, to provide a spring-power and suitable gearing for operating the dasher, with a view of rendering the same in a high degree effective, convenient, and especially adapted to the requirements of service; second, to afford facilities for the proper adjustment of the device to the different sizes of churns, and to provide for the quick and convenient detaching of the churn from the driving mechanism. I attain these objects by the mechanism illustrated in the accompanying drawings, in which—

Figure 1:
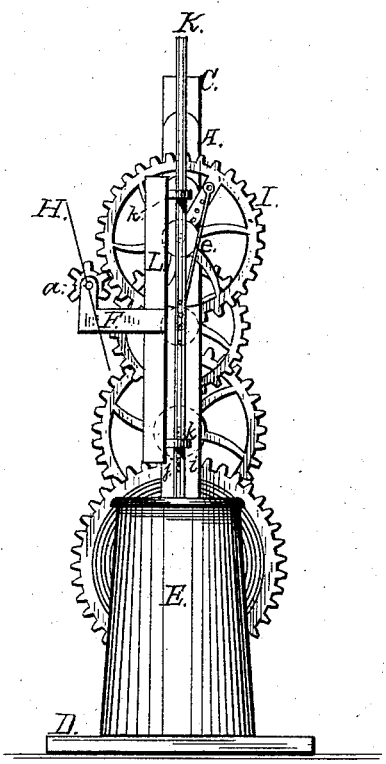
Figure 2:
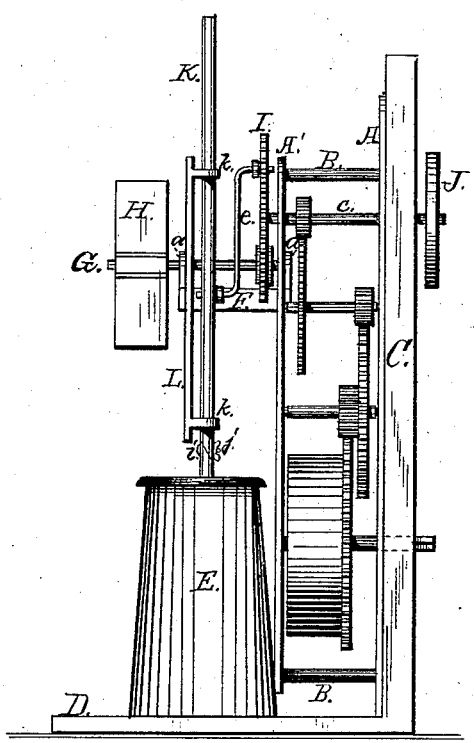

Figure 1 is a front elevation of the entire mechanism, and Fig. 2 a side view of the same.

Similar letters refer to similar parts throughout the several views.

The frame-work which carries the train of gearing for actuating the churn-dash consists of two vertical bars, A A', held at suitable distances apart by cross-bars B. This frame-work is of metal, and is secured to a vertical post, C, which may be of wood, and attached to a platform, D, upon which the churn E rests.

From the bar A' extends an arm or bracket, F, in which are formed bearings $a$ for shaft G. To one end of this shaft is attached a fan, H, which serves the double purpose of regulating the speed of the dasher and also of fanning insects from about the churn.

I designates the crank-wheel for operating the dasher-shaft, and it is secured to one end of shaft $c$. At the other end is secured a balance-wheel, J, as shown in Fig. 2.

$e$ is a detachable pitman, which connects the wheel I and dasher-shaft K, the said pitman being fitted at one end into a series of holes formed in the dasher-shaft, and at its remaining end into one of a series of holes formed in a spoke of the crank-wheel I.

The dasher-shaft has a beveled splice at $i$, and when attached to power is secured by thumb-screw $j$, and it moves freely up and down in bearings $k k$, attached to vertical bar L, that is supported by bracket F.

By removing the thumb-screw the churn can be readily taken from the platform D and either emptied or filled, as the case may be, and then the several parts reconnected for purposes of churning.

Having thus described my invention, what I esteem as new, and desire to secure by Letters Patent, is—

The combination, in a churn-power, of the bracket F, projecting from and secured to the frame-work at one side, the vertical bar L, having guides $k$ at its end, the rod K, having its lower end beveled and provided with a thumb-screw by which it may be attached to the dasher-rod of a churn, a detachable pitman, $e$, and fan H, all arranged to operate substantially as described.

JOSEPH A. LAWRENCE.

Witnesses:
 THOS. W. RANDOLPH,
 FRED WIDMANN.